United States Patent [19]

Barton

[11] 4,150,378

[45] Apr. 17, 1979

[54] HEIGHT FINDING RADAR

[75] Inventor: Paul Barton, Bishops Stortford, England

[73] Assignee: International Standard Electric Corporation, New York, N.Y.

[21] Appl. No.: 885,606

[22] Filed: Mar. 13, 1978

[51] Int. Cl.² .......................... G01S 9/22; G01S 3/48
[52] U.S. Cl. .............................. 343/16 M; 343/113 R
[58] Field of Search ............ 343/16 M, 19 R, 113 R, 343/853

[56] References Cited

U.S. PATENT DOCUMENTS 3,343,165  9/1967  Sleeper, Jr. ..................... 343/16 M
3,636,563  1/1972  Laverick et al. ................. 343/113 R Primary Examiner—Maynard R. Wilbur
Assistant Examiner—Richard E. Berger
Attorney, Agent, or Firm—William T. O'Neil

[57] ABSTRACT

A height finding arrangement for a range/azimuth surveillance radar using a mechanically rotated planar antenna array. The received outputs from the array are combined with suitable weighting functions to give two sectorial pattern signals whose effective phase centers are respectively above and below the center of the array aperture. The phase difference between these two signals is measured to provide the elevation angle of the target.

6 Claims, 5 Drawing Figures

FIG.1.

HEIGHT FINDING RADAR

BACKGROUND OF THE INVENTION

This invention relates to height finding arrangements for radar systems of the type using a mechanically rotated planar antenna array for range and azimuth determination.

A typical range/azimuth radar surveillance system uses a mechanically rotated planar antenna array in conjunction with a pulsed transmitter and receiving system to provide range and azimuth data for targets within a prescribed coverage volume. Many such radars will, in addition, be able to discriminate among plural targets in any given range/azimuth cell by virtue of their different relative velocities (and hence different Doppler shifts) in the direction of the radar. In the prior art, such capability is most commonly achieved by 'linking' the receiver local oscillator(s) coherently with the transmitted frequency and applying a succession of received signals to "Doppler filters", each filter responding to a different Doppler frequency shift.

Prior art systems have not provided accurate and economically instrumented height-finding in a continuously scanning mode. The manner in which the present invention advances this art will be understood as this description proceeds.

SUMMARY OF THE INVENTION

The general object of the present invention is to supply the radar operator or central processing unit with elevation angle data in addition to azimuth, range and range rate (Doppler) on selected targets within the coverage volume.

According to the present invention, there is provided a height-finding arrangement for a radar system of the type in which a transmitter and a receiver are coupled via a power splitter/combiner unit to a plurality of antenna elements arranged in a series of vertically displaced positions, the arrangement including means for coupling out a portion of the received power from each of the vertical positions, means for combining this coupled-out power from each portion to form first and second composite signals, the combining means applying substantially equal and opposite amplitude weighting functions to the power distributions from the vertical positions, said weighting functions each being assymetric with respect to the center of the antenna array and having effective phase centers which are equally offset one on each side of the center of the array, and means for determining the phase difference between the first and second composite signals.

An embodiment of the invention will be hereinafter described with reference to the accompanying drawings.

DETAILED DESCRIPTION

Figure 1:
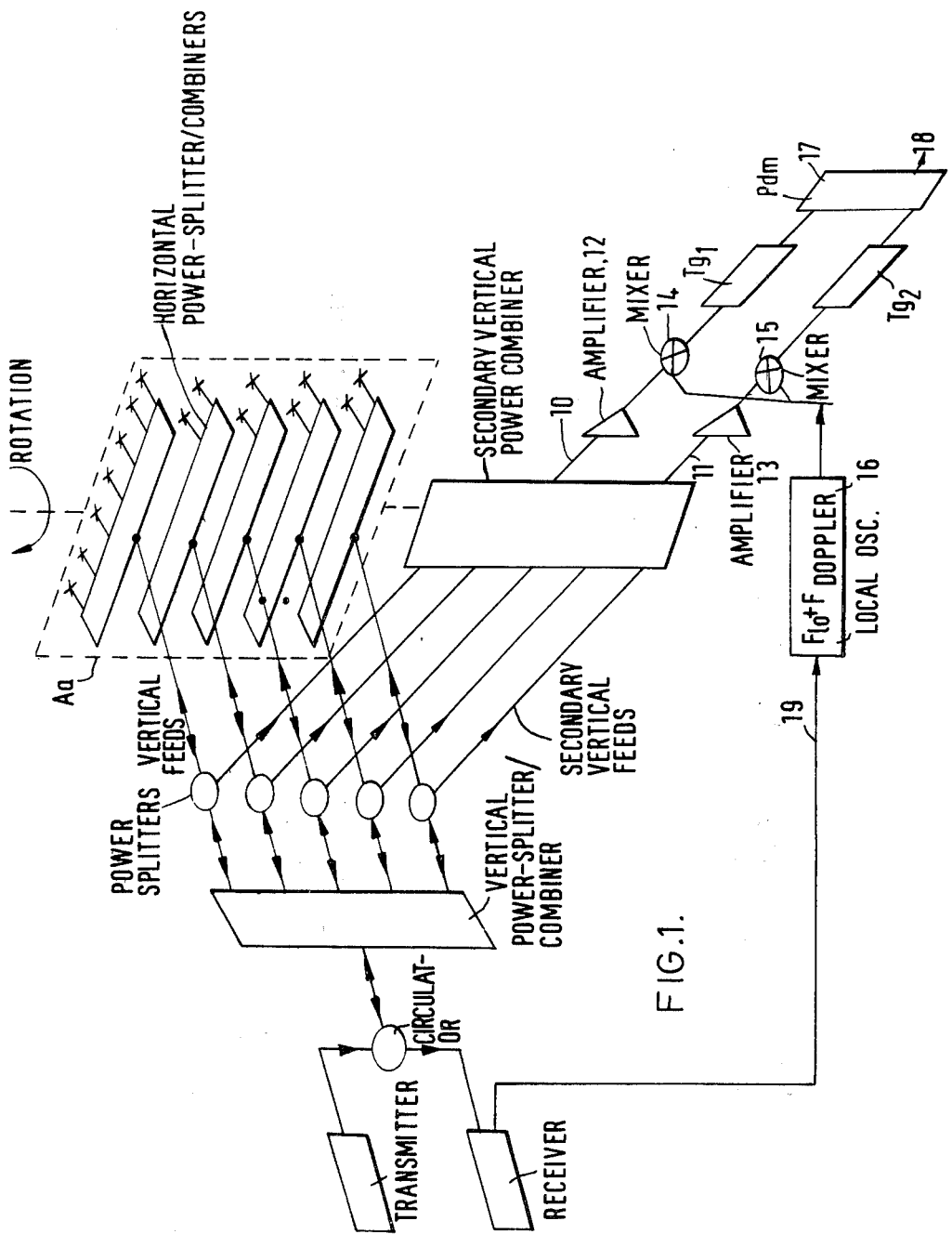
FIG. 1 illustrates a height-finding arrangement for a typical range/azimuth surveillance radar.

In the height-finding arrangement shown in FIG. 1, a conventional range/azimuth surveillance radar is depicted with height-finding apparatus according to the invention. The radar transmitter and receiver are connected via a circulator to a vertical power splitter/combiner from whence a number of vertical feeds lead to the mechanically rotated antenna array Aa. The array has a number of horizontal power splitter/combiners each of which has feeds to the individual radiators in a corresponding horizontal row of the array, as shown in FIG. 1.

The height-finder arrangement includes a number of power splitters in series with the vertical feeds, by means of which a portion of the received signal power in each feed is tapped off. The tapped-off power is fed via secondary feeds to a secondary vertical power combiner in which the tapped-off power is combined to form two sectorial pattern signals. In effect, each secondary power feed Vfs feeds an individual power splitter, the two outputs of which are controlled by weighting functions so that all the first outputs thereof are combined to form one sectorial pattern and all the second outputs are combined to form the second sectorial pattern. The signals corresponding to these first and second sectorial patterns are extant on leads 10 and 11 from the secondary vertical power combiner, respectively.

Figure 2:
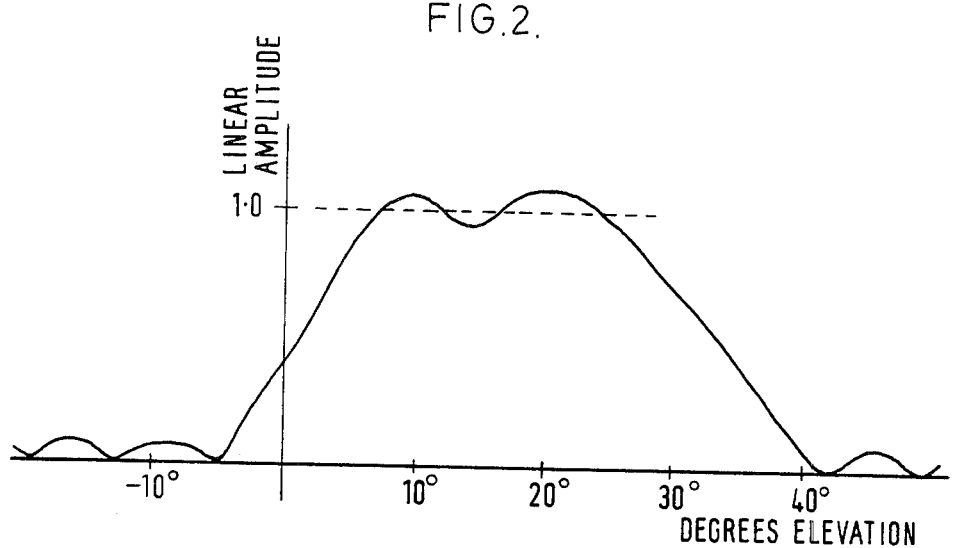
FIG. 2 illustrates a sectorial pattern associated with the antenna array of the radar of FIG. 1.
Figure 3:
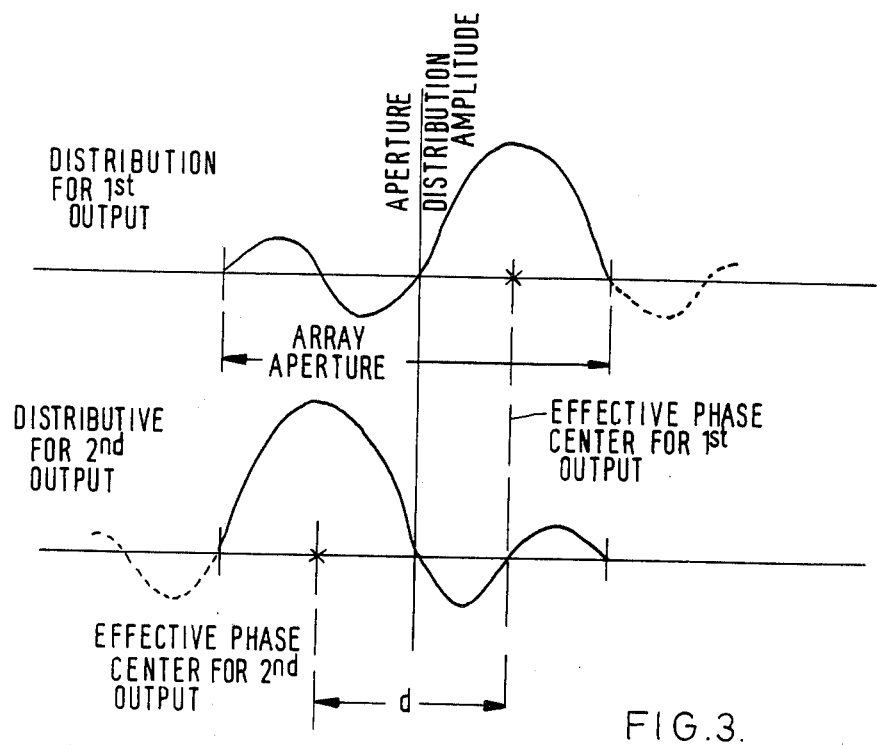
FIG. 3 illustrates weighting functions employed in the formation of composite signals.

The two sectorial patterns each have the form shown in FIG. 2 in which the linear amplitude of the pattern signal is plotted against elevation angle. The appropriate distributions of the individual vertical feeds, i.e., the weighting functions required to produce the separate patterns as aforementioned, are shown in FIG. 3. The two distributions of FIG. 3 are substantially equal but opposite in order to provide the separated effective phase centers. The sectorial patterns are advantageous in that they provide a sharp cut-off at and below the horizon, thus reducing ground multipath effects. Because their effective phase centers are off-set, one above and one below the center of the array, the angle can be derived in a simple manner by measuring the phase difference between the outputs.

The two outputs from the secondary vertical power combiner are separately amplified in 12 and 13 and then mixed with the output of a local oscillator 16 the frequency of which is $F_{lo} + F_{Doppler}$, where $F_{lo}$ is the main radar local oscillator frequency (supplied via lead 19) and $F_{Doppler}$ is the Doppler shift frequency resulting from movement of the target and is extracted from the main radar in the well known manner.

The "zero IF signals" resulting are then passed through separate time gates (Tg1 and Tg2) and then are fed to a conventional phase difference measuring circuit 17. The output 18 is then a phase difference analogous to an angle measurement.

Unlike the arrangement employing essentially undirective elements, the present arrangement has a much reduced susceptibility to multipath components and thus minimizes both the signal fading that can occur and also the perturbation of measured phase caused by the target's image in the ground. For instance, if the residual ground multipath is reduced to an amplitude of 0.1 relative to the direct return by virtue of the sharp cut-off sectorial patterns, then the perturbation of the phase measurement due to multipath is limited to 6 electrical degrees in the worst case. With phase centers separated by 1.5 wavelengths, for example, the configuration is capable of providing an elevation coverage of up to 40 degrees with errors due to multipath of under one elevation degree. The selection of appropriate target range/azimuth cells within which there are targets whose elevation is to be measured is performed simply in the present example by appropriately time-gating the signals in the sub-system. The selection of a prescribed Doppler cell can be achieved either by Doppler filtering as in the main radar or by correlating the returns against a local oscillator whose frequency is perturbed from the main local oscillator by an amount equalling the prescribed Doppler shift.

Figure 4:
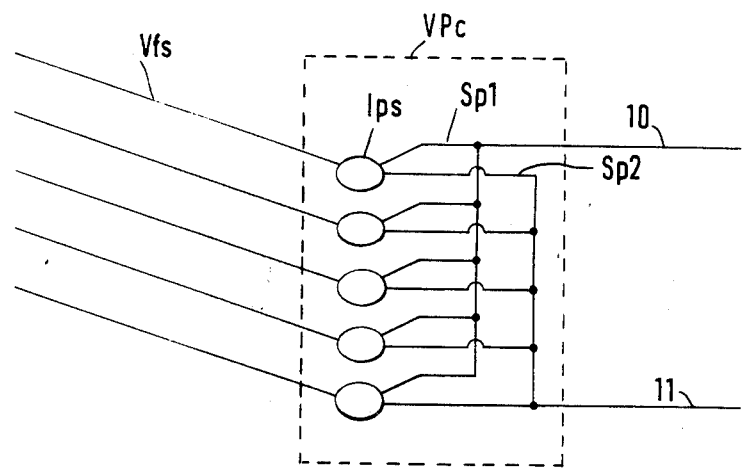
FIG. 4 illustrates apparatus for forming composite signals in accordance with the weighting functions of FIG. 3.

The secondary vertical power splitter Vpc is illustrated in more detail in FIG. 4. The secondary feeds Vfs each terminate in individual power splitters Ips, as aforementioned, each of which has two outputs $S_p1$ and $S_p2$. The amplitudes of these two outputs are weighted by the response of the Ips units according to the required distributions as shown in FIG. 3. All the $S_p1$ outputs are then combined to provide one sectorial pattern signal, and all the $S_p2$ outputs are combined to provide the other sectorial pattern signal (outputs 10 and 11).

Figure 5:
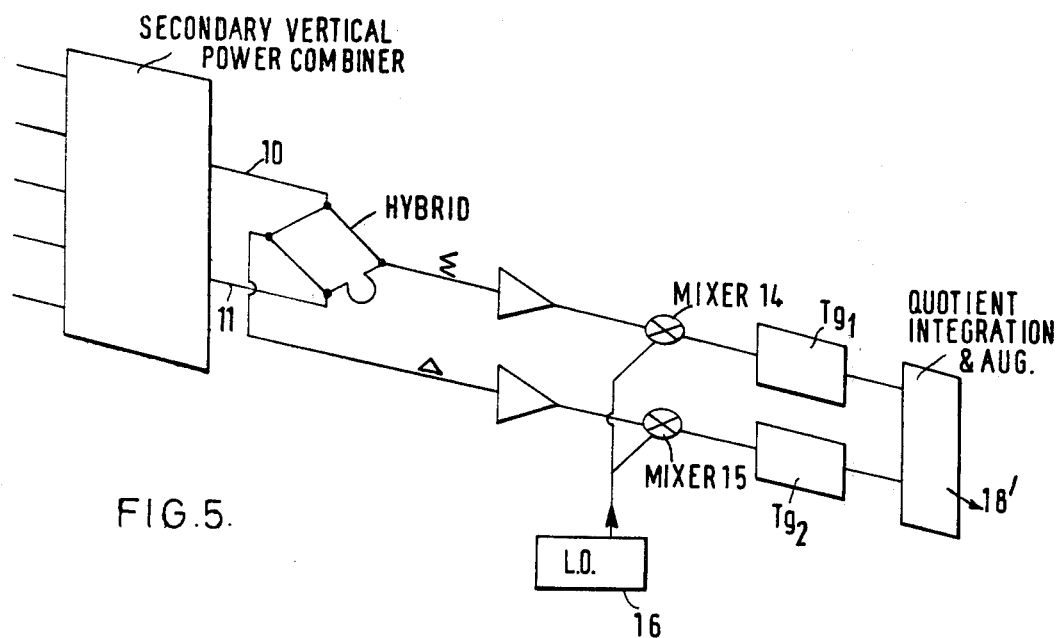
FIG. 5 illustrates an alternative to the arrangement of FIG. 4.

In the alternative arrangement shown in FIG. 5, the two sectorial pattern signals produced at the outputs 10 and 11 of Vpc are fed to a hybrid network $H_\eta$ where they are combined to give sum $\Sigma$ and difference $\Delta$ outputs. The sum output is proportional to $\cos \Psi/2$ and the difference output proportioned to $\sin \Psi/2$ where $\Psi$ is the phase difference between the two outputs. The quotient $\Delta/\Sigma$ is formed in the receiver, with appropriate integration and averaging at output 10, and is a direct measure of $\tan \Psi/2$ hence related simply to elevation angle.

What is claimed is:

1. In a range/azimuth radar system having transmitting, receiving, and duplexing means connected to a beam-forming planar array arranged with M vertically stacked horizontal rows of N radiating elements each, said array being rotatable in the azimuth plane for azimuth scanning, apparatus for contemporaneous elevation angle determination comprising:

first means comprising M first power divider/combiners each having N ports, one connected to each of said N radiating elements of a corresponding one of said M horizontal rows of radiating elements, each of said first power divider/combiners having a main input/output terminal therefor, thereby providing M main input/output terminals;

second means comprising a second power divider/combiner having M individual ports and a main input/output port, and M vertical feeds, one from each individual port of said second power divider/combiner to a main input/output port of a corresponding one of said first power divider/combiners;

third means comprising a secondary vertical power combiner having M input ports, and means for coupling a predetermined portion of the signal energy in each of said M vertical feeds discretely to a corresponding input of said secondary vertical power combiner;

fourth means within said third means for providing first and second outputs, said first output comprising the combination of said M vertical feed signals weighted in a predetermined order beginning from a first end input port of said secondary vertical power combiner, said second output comprising the combination of said M vertical feed signals weighted in said predetermined order having the same progression throughout said M vertical feed signals as applied to said first output, except that said weighting is applied beginning from the second input port of said secondary vertical power combiner;

and fifth means for determining said vertical angle as a function of the phase difference between said first and second outputs of said fourth means.

2. Apparatus according to claim 1 in which said secondary vertical power combiner comprises a power splitter in series with each of said M secondary vertical power combiner input signals and a pair of outputs, one contributing to said first output of said fourth means and the other to said second output of said fourth means.

3. Apparatus according to claim 1 further including mixing means for mixing each of said first and second fourth means outputs against a local oscillator signal which is the local oscillator frequency of said receiving means plus the separately provided Doppler frequency of a selected signal of interest.

4. Apparatus according to claim 1, 2 or 3, further including gating means in series with each of said fourth means outputs for selecting a range bin within the signal trains of said fourth means outputs in response to an externally supplied gating signal.

5. Apparatus according to claim 1 further comprising a hybrid responsive to said fourth means outputs and connected to provide sum and difference signals therefrom and quotient means for dividing said difference signal by said sum signal to provide an output signal, the analog of which is a measure of elevation angle.

6. Apparatus according to claim 5, further including gating means in series with each of said fourth means outputs for selecting a range bin within the signal trains of said fourth means outputs in response to an externally supplied gating signal.

* * * * *